Sept. 8, 1970     E. D. MARADYN     3,527,495
GRAPPLE
Filed May 1, 1968     2 Sheets-Sheet 1
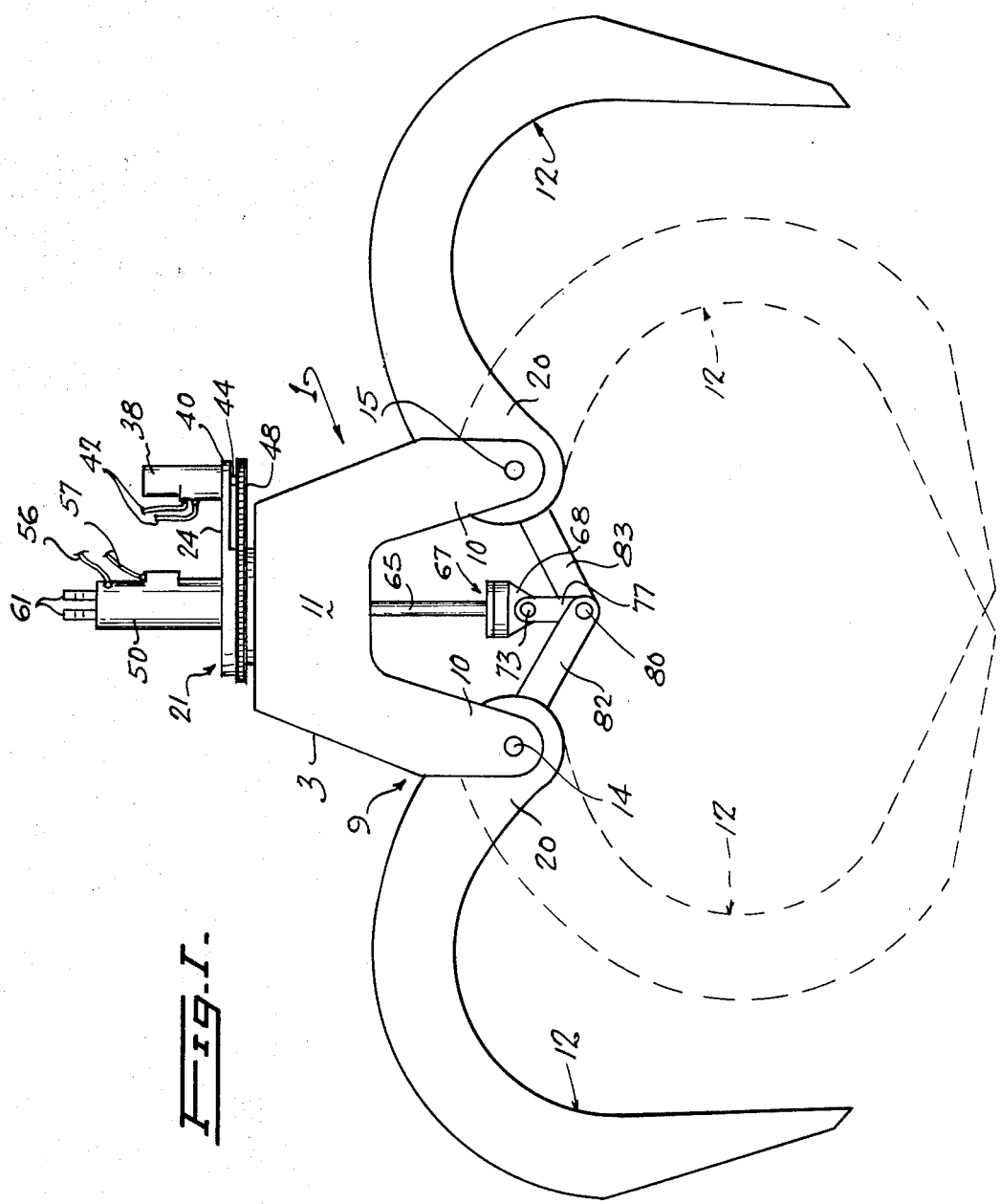
Fig. I.

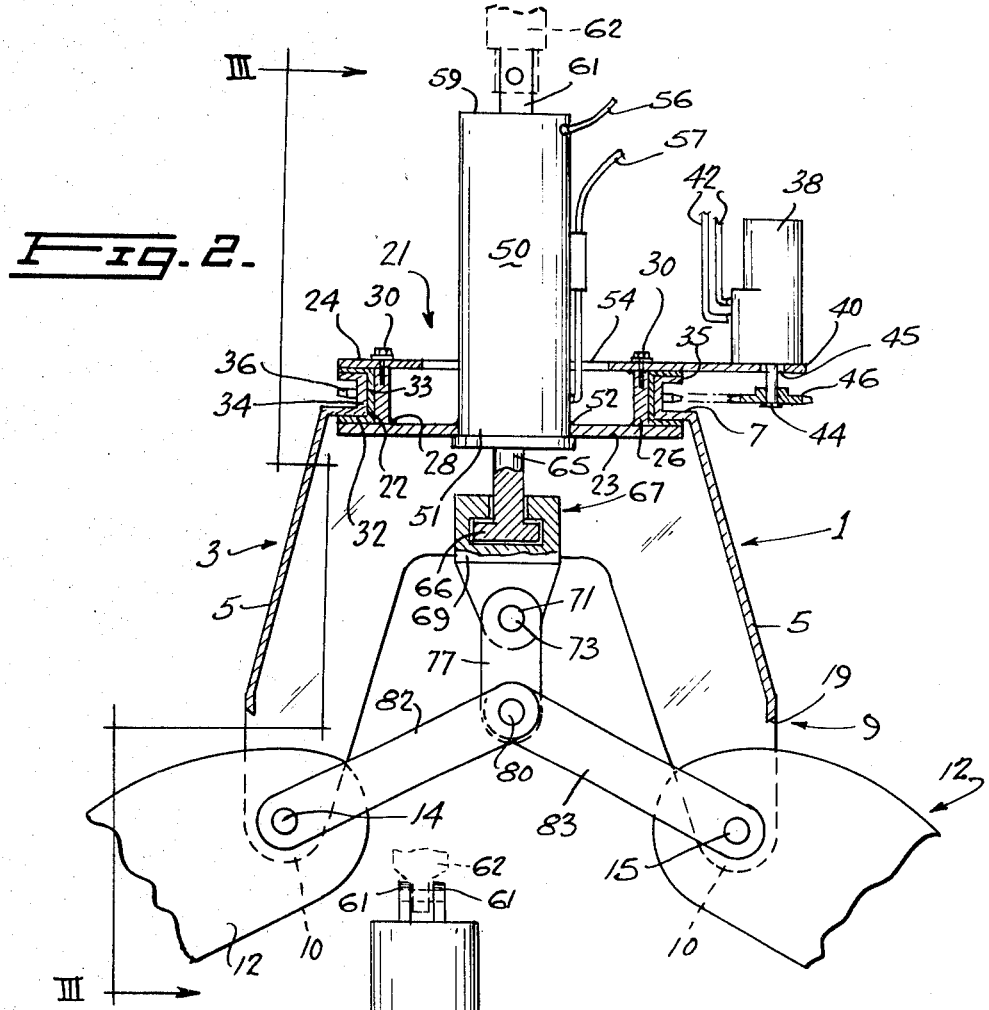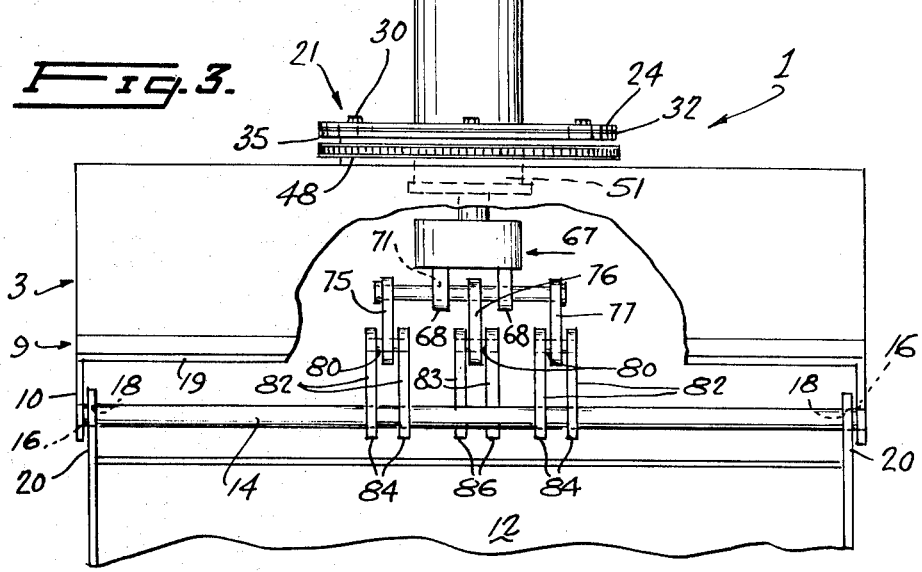

United States Patent Office 3,527,495
Patented Sept. 8, 1970

3,527,495
GRAPPLE
Edward D. Maradyn, Fort William, Ontario, Canada, assignor to The Northern Engineering & Supply Co. Limited, Fort William, Ontario, Canada
Filed May 1, 1968, Ser. No. 725,775
Claims priority, application Canada, Apr. 3, 1968, 16,608
Int. Cl. B66c 1/10
U.S. Cl. 294—88      2 Claims

ABSTRACT OF THE DISCLOSURE

A grapple having a jaw structure which is rotatable as a unit through an unlimited arc about a vertical axis by a first hydraulically operated mechanism. The parts of the jaw structure are also movable between an open and a closed condition by a second hydraulically operated mechanism. The two hydraulically operated mechanisms are mounted on a non-rotatable platform about which the jaw structure rotates.

BACKGROUND OF THE INVENTION

This invention relates to a grapple, and in particular to a pressure-fluid-operated grapple having a jaw structure which is rotatable as a unit through at least 360°, and preferably through an unlimited arc, about a vertical axis.

Pulpwood and logs are often found in a condition of random orientation, and are thus difficult to pick up with a conventional grapple, the jaws of which cannot readily be rotated about the vertical axis of the grapple to assume a favourable orientation with respect to the logs or pulpwood.

To overcome the above difficulty some of the presently available hydraulically operated grapples for handling pulpwood and locks have been designed for rotation about a vertical axis, but, in practice, this rotation has always been restricted to a finite arc less than 360°. Continuous or unlimited rotation has not been possible with the constructions previously adopted, because of the need to bring hydraulic fluid lines to the rotatable parts for operation of the jaws. Moreover, the mechanisms previously employed to rotate the grapple have been relatively complicated, and thus subject to breakdown.

SUMMARY OF THE INVENTION

The object of the present invention is to provide a relatively simple grapple with a pressure-fluid-operated jaw structure that can be rotated through at least 360°, and preferably continuously (i.e., through an unlimited arc) about a vertical axis, without interference with or risk of damage to the pressure-fluid portions of the device, more especially the hoses or other lines conveying such fluid.

Accordingly, the invention consists of a grapple comprising:

(a) a jaw structure (e.g., a pair of jaws);
(b) a yoke including means movably mounting the jaw structure thereon for movement between a pair of conditions, (e.g., a pair of spaced-apart shafts extending between opposite ends of the yoke on each of which an individual jaw is mounted for rotation about a horizontal axis so that together the jaws can define either an open or a closed condition);
(c) a platform (e.g., a top and a bottom plate separated by a cylindrical spacer element);
(d) first bearing means rotatably mounting the yoke on the platform for rotation about an axis (normally the vertical axis, although some tilting of the apparatus is possible);
(e) first pressure-fluid-operated means mounted on the platform for rotating the yoke relatively to the platform about such axis (e.g., a hydraulic motor, the drive shaft of which is provided with a first sprocket connected to a second sprocket, secured to the yoke, by a roller chain);
(f) second pressure-fluid-operated means mounted on the platform for moving the jaw structure between its two conditions (e.g., a hydraulic piston and cylinder arrangement, the cylinder being mounted on the platform and the bottom end of the piston being connected to the jaws by a link assembly); and
(g) second bearing means interconnecting the jaw means and the second pressure-fluid-operated means for relative rotation about said axis (e.g., a thrust bearing connecting the bottom of the piston with the remainder of the link assembly).

By virtue of the fact that in this apparatus both the pressure-fluid-operated means to which fluid must be conveyed are mounted on the platform, which does not rotate with the jaw structure, the fluid lines to these operating parts of the apparatus are not subject to movement, no matter how large the arc through which the jaw structure is turned.

BRIEF DESCRIPTION OF THE DRAWINGS

A preferred embodiment of the invention will now be described with reference to the accompanying drawings, wherein:

FIG. 1 is an end view of a grapple constructed in accordance with the present invention;

FIG. 2 is a partly sectioned view of a portion of the grapple of FIG. 1 showing the parts in a different position; and FIG. 3 is a partly sectioned side view, taken from the left of FIG. 2, generally on the line III—III in FIG. 2.

DESCRIPTION OF PREFERRED EMBODIMENT

With reference to the drawings, the grapple includes a yoke 1 which is generally rectangular in plan view. The yoke 1 is formed with a top portion 3, side walls 5 of which taper upwardly to a flat top wall 7; and a lower portion 9 consisting of a pair of arms 10 extending downwardly from each end wall 11 of the yoke 1 for supporting a pair of arcuate jaws 12. Each jaw 12 is pivotably connected between a pair of opposed arms 10 by being secured to a respective shaft 14, 15 pivotally extending through aligned apertures 16 and 18, formed respectively in the bottom ends of the arms 10 and in flanges 20 that constitute the end walls of the jaws 12. The jaws 12 are pivotable with the shafts 14, 15 between an open condition shown in solid lines in FIG. 1) and a closed condition (shown in phantom outline in FIG. 1). Bottom edges 19 of the side walls 5 act as stops for the jaws 12 in their open condition.

The yoke 1 is pivotally supported by means of its top wall 7 in a platform shown generally at 21, the top wall 7 being provided with an aperture 22 for this purpose. The platform 21 includes an annular bottom plate 23 of larger diameter than the aperture 22 and disposed inside the yoke 1 beneath the top wall 7 thereof. A top plate 24 located above the top wall 7 of the yoke 1 is connected to the bottom plate 23 by a cylindrical spacer element 26, one end of which is welded to the bottom plate 23 at 28 and the other end of which is secured to the top plate 24 by bolts 30.

YOKE ROTATING MECHANISM

A yoke rotating mechanism is provided on the platform 21 including an annular bearing 32 of generally U-shaped cross section, disposed between the platform 21 and the edge of the aperture 22, with the back of the web 33 of the bearing 32 lying against the cylindrical spacer element 26. An upwardly extending cylindrical flange 34, with an outwardly extending top portion 35, is connected to the top wall 7 of the yoke 1 around the periphery of the aperture 22. As a result of this construction the yoke 1 can be rotated about a vertical axis within the platform 21, but these relatively rotatable parts bear a fixed relationship to each other in the axial (vertical) direction. A sprocket 36 is rigidly secured to the flange 34 for rotation therewith.

Also part of the yoke rotating mechanism is a hydraulic or other fluid-pressure-operated (e.g., pneumatic) motor 38 mounted on an extension 40 of the top plate 24. The motor 38 includes pressurized fluid inlet and outlet lines 42 and a drive shaft 44 extending downwardly through an aperture 45 in the plate extension 40. A sprocket 46 is securely mounted on the drive shaft 44 for rotation therewith. The sprockets 36 and 46 are interconnected by a roller chain 48 (see FIGS. 1 and 3), whereby actuation of the hydraulic motor 38 results in rotation of the yoke 1 about the platform 21.

JAW OPERATING DEVICE

A hydraulic or other fluid-pressure-operated cylinder 50 is secured to the platform 21, the lower end 51 of the cylinder 50 extending through the bottom plate 23 and being joined thereto by suitable means, such as welding at 52. The cylinder 50 projects upwardly through an aperture 54 in the top plate 24 and is provided with lines 56 and 57 for pressure fluid. The top wall 59 of the cylinder 50 is provided with a pair of upwardly extending, apertured lugs 61 for connecting the grapple to a boom 62, an end of which is shown in phantom outline in FIGS. 2 and 3.

A piston 65 extends downwardly from the lower end 51 of the cylinder 50 and is connected to an inner part 66 of a conventional cylindrical thrust bearing 67. A pair of parallel, arcuate lugs 68, integral with the casing 69 of the thrust bearing 67, are provided with aligned apertures 71 for receiving a pin 73. Three link bars 75, 76 and 77 are pivotally connected to the pin 73 which extends through their upper ends. The lower end of each of the bars 75, 76 and 77 includes an aperture for receiving a pin 80. A pair of parallel connecting rods 82 or 83 is pivotally connected to each pin 80. The lower end 84 of each of the connecting rods 82 is rigidly connected to the shaft 14, and the lower end 86 of each of the connecting rods 83 is rigidly connected to the other shaft 15.

OPERATION OF PREFERRED EMBODIMENT

In operation, the jaws 12 of the grapple are opened or closed by feeding pressurized fluid to one or the other end of the cylinder 50. It is readily apparent that upward movement of the piston 65 results in an inward or closing movement of the jaws 12, and downward movement of the piston 65 results in an outward or opening movement of the jaws 12.

To rotate the yoke 1 and consequently the jaws 12 as a unit, the motor 38 is actuated to rotate the drive shaft 44 and sprocket 46. This rotation is transmitted to the yoke 1 through the roller chain 48 and sprocket 36 to cause rotation of the jaws 12, while the platform 21 remains stationary. The presence of the thrust bearing 67 permits the cylinder 50 and the piston 65 to remain stationary while the jaws 12 rotate.

It will be noted that the fluid lines 42, 56 and 57 are connected only to stationary parts and that the yoke 1 can be rotated continuously (i.e., in an unlimited arc), in either direction without danger of these fluid lines becoming entangled with one another or other parts of the apparatus.

It will also be noted that the closing force applied to the jaws 12 is determined solely by the fluid-pressure-operated piston 65 and is independent of the weight of the assembly and the load carried thereby, which weight is transmitted to a lifting device (e.g., boom 62) through lugs 61 that are connected to the platform 21 through the cylinder 50.

I claim:
1. A grapple assembly comprising:
   (a) a yoke;
   (b) a jaw structure including a pair of jaws mounted on said yoke for rotation between open and closed conditions, and for carrying a load when in the closed condition;
   (c) a platform;
   (d) first bearing means rotatably mounting said yoke on said platform for rotation about an axis, said bearing means maintaining said yoke and platform in a fixed relationship to each other in the direction of said axis;
   (e) first fluid-pressure-operated means mounted on said platform for rotating said yoke relatively to said platform about said axis;
   (f) second pressure-fluid-operated means including a piston and cylinder arrangement, the cylinder being mounted on said platform, and the piston being connected to said jaw structure for rotating said jaws between said open and closed conditions;
   (g) second bearing means interconnecting said jaw structure and said second pressure-fluid-operated means for relative rotation about said axis; and
   (h) means for connecting said platform to a lifting device for elevating the grapple assembly;
   (i) said second pressure-fluid-operated means acting to exert on said jaws a closing pressure that is independent of the weight of the assembly and any load carried thereby transmitted to the lifting device by said connecting means.

2. A grapple assembly according to claim 1 wherein said second bearing means includes a thrust bearing connected to the outer end of said piston, a link mechanism connecting said thrust bearing with each of said jaws, whereby said jaws can be rotated with said yoke about said axis independently of said piston.

References Cited

UNITED STATES PATENTS 569,939  10/1896  Sawyer _____ 294—115

EVON C. BLUNK, Primary Examiner

W. S. CARSON, Assistant Examiner

U.S. Cl. X.R.

294—106